United States Patent Office 3,298,188
Patented Jan. 17, 1967

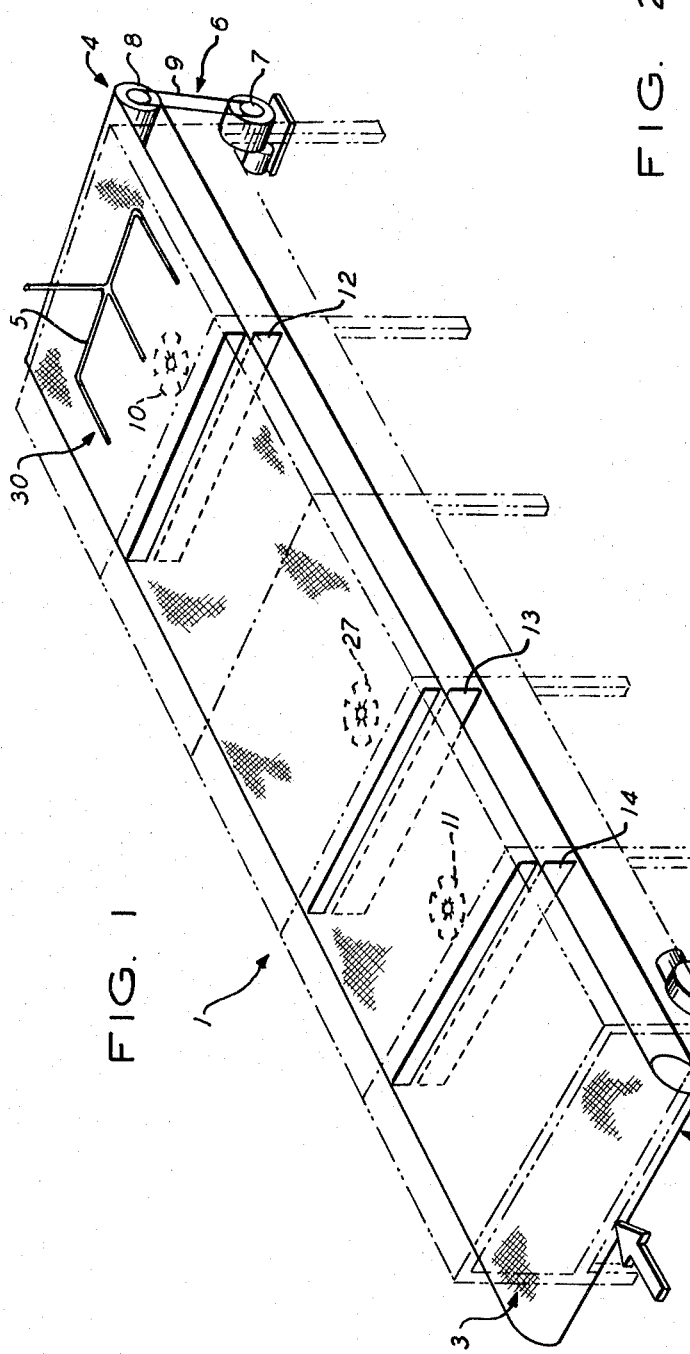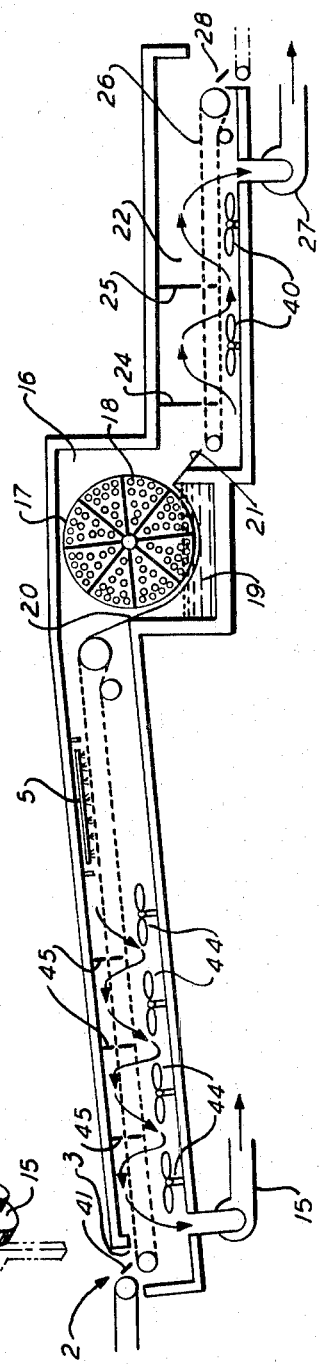

3,298,188
METHOD AND APPARATUS FOR FREEZING FOOD PRODUCTS
Robert C. Webster, Madison, Wis., and John S. Hinn, Minneapolis, Minn., assignors to Air Reduction Company, Incorporated, New York, N.Y., a corporation of New York
Filed Apr. 24, 1964, Ser. No. 362,226
10 Claims. (Cl. 62—63)

This invention relates to a method of and apparatus for food preservation, such food preservation resulting from heat exchange contact of the food with a cryogenic media.

More specifically, this invention relates to a method of and apparatus for preservation of articles of food in which a cryogenic media which effects freezing of the articles is utilized in an economic manner to produce rapidly frozen food articles, which are both satisfying to the taste and in appearance.

More specifically, this invention relates to a method of and apparatus for food freezing as a result of heat exchange between the food and a cryogenic media, including a system for diverting the cryogenic media after utilization in one form for further use in another form, so as to economically utilize said cryogenic media.

More specifically, this invention relates to a method of and apparatus for economic utilization of a cryogenic media used in the freezing of food articles as a result of heat exchange contact with said articles while said media is in liquid and vapor form, including a method of and apparatus for diverting the cryogenic media for economical utilization thereof in said different forms.

There have been many proposals as to methods of and apparatus for the rapid freezing of articles of food as a result of heat exchange contact with a cryogenic media. Such apparatus included structures for direct immersion of food articles in a cryogenic liquid (immersion freezing), for spraying food articles with a cryogenic liquid (spray freezing), and for combinations of immersion and spray freezing. The patent to Hill, 2,447,249, for example, discloses a method of and apparatus for rapid freezing of articles as a result of heat exchange contact, either direct immersion or spray, of that food article with a cryogenic liquid. Rapid freezing of articles of food as a result of heat exchange contact with a cryogenic media is desirable, as compared to other refrigeration techniques, because in brief, the extremely rapid freezing of an article of food does not allow time for the occurrence of the damaging crystal growth within the article of food which occurs when food articles are frozen by slower conventional methods, which crystal growth results in breaking of the cell structure of the article of food and resulting destruction of structure and taste characteristics. The extremely rapid freezing of the article of food occurs as a result of the low temperature of the cryogenic media (liquid nitrogen is at a temperature of −320° F.).

In order to economically freeze articles of food with a cryogenic media, however, efficient use of the cryogenic media must be employed. The patent to Hill, previously mentioned, discloses the utilization of the cryogenic media in its vapor form to cool the article of food prior to contact of the article with the cryogenic media as a liquid, presumably to insure at least some economic use of the cryogenic media. However, substantially full and efficient utilization of the cryogenic media in both liquid and vapor form is not found in the Hill disclosure.

The patent to Reynolds, 2,784,567, discloses structure in which the article of food is first sprayed with cryogenic liquid in order to cause surface freezing and then is immersed in a bath of cryogenic liquid, so as to be completely frozen. Reynolds thus discloses the reuse of the cryogenic media in liquid form, but substantial measures insuring the efficient utilization of the cryogenic media so as to render such utilization economic are not a part of the Reynolds disclosure.

The many structures proposed in the past, of which two examples have been given, for freezing articles of food as a result of heat exchange contact with a cryogenic media have suffered from the drawbacks that they are either found to be inoperative, or damaging to the articles of food being frozen because, for example, of poor handling of said articles, or uneconomic operation, usually due to inefficient and incomplete utilization of the cryogenic media in its different forms. In order to significantly improve the rapid freezing of food articles by spray and/or immersion freezing, it is necessary to improve over the prior methods of and apparatus for food freezing as a result of contact with a cryogenic media by improving and thus making more economic the utilization of the cryogenic media in its different states and the handling of the food articles.

It is an object of this invention to provide an economic method of and apparatus for freezing articles of food.

It is a further object of this invention to provide a method of and apparatus for freezing articles of food which results in handling of the articles such that the articles are not damaged during said handling.

It is further an object of this invention to provide a method of and apparatus for freezing food which more efficiently exploits the cryogenic media employed in the freezing of the food.

It is further an object of this invention to provide a method of and apparatus for freezing articles of food which utilizes in an economic manner the cryogenic media in more than one step of the rapid freezing of articles of food, including provision for efficient circulation of the cryogenic media in more than one form.

Other objects and advantages of this invention will be stated or become evident in connection with the following description.

It is a feature of apparatus designed according to this invention for accomplishing the economic utilization of the cryogenic freezing media that it be generally inclined upward at an angle from the infeed end toward the areas of rapid freezing of the food article, as by direct immersion in a cryogenic bath or as by spray freezing with a cryogenic liquid. Apparatus designed according to this invention is constructed in such a way that vapor from the boiling cryogenic media of the just-mentioned immersion bath or liquid spray, for effecting at least part of the freezing of articles of food, flows toward the infeed end of the apparatus. Since the cryogenic media, in the form of a cryogenic liquid, evolves into a gas as the liquid contacts the articles of food, which are relatively warmer, said media withdrawing heat from the articles of food as it evaporates, the evolved gas, being dense because of its low temperature, flows in a downwardly direction towards the infeed end of the apparatus. The downwardly flowing vapor is utilized to precool the articles of food, which are moving in a counter-current direction to the downwardly flowing vapor, thus increasing the recovery of refrigeration from the cryogenic media in a simple and dependable manner. Besides serving to precool the articles of food in a simple and more important economic manner, the descending vapor from the cryogenic media firms the articles of food, as a result of imparting refrigeration to the articles, so that transfer of each article to the area in which it contacts the cryogenic media in the form of a liquid is facilitated without cracking or distortion of the article. Furthermore, fan and baffle means are advantageously employed in combination with the inclined surface in order to utilize the descending vapor to the fullest possible extent during its travel toward the lower end of the apparatus, by directing the flow of vapor over, under and around the precooling food articles while said articles travel toward the cryogenic liquid.

According to this invention, the cryogenic liquid employed may be put in contact with the articles of food by either spray of the articles with the liquid or immersion of the articles in a liquid bath. The rapid freezing occurring as a result of heat exchange contact of the articles of food with the cryogenic liquid, resulting in small crystal growth within the articles of food and excellent quality food upon thawing, may also be brought about as a consequence of first spraying the articles of food with a cryogenic liquid followed by immersing said article in a cryogenic liquid bath in order to effect either partial or complete freezing. In either the case of immersion in a bath of cryogenic liquid or spray with a cryogenic liquid, the cryogenic liquid evolves into a vapor as the cryogenic liquid is placed in heat exchange contact with the food articles, and said vapor moves toward the lower part of the machine effecting pre-cooling, firming of the food articles to provide for good and easy handling, and economic use of the cryogenic media.

A post-cooling area may also be included advantageously in apparatus designed according to this invention, in order to provide for equilibration of the temperature of the articles of food in a controlled atmosphere at a temperature at or below about 0° F. In a similar manner to that just described with relation to pre-cooling the refrigeration for post-cooling is preferably supplied from the vapors evolving from contact of the cryogenic liquid with the articles of food earlier described. The vapor used for post-cooling may advantageously be more efficiently circulated in combination with the use of an inclined surface by the use of fans and baffles so as to circulate said vapor over, under and around the articles of food.

The term "cryogenic media" refers to a freezing media with a temperature of −100° F. or below, such as, preferably nitrogen in either liquid (temperature −320° F.) or vapor forms. It is to be understood that any cryogenic media desired may be employed, such as, for example, nitrous oxide.

The subject matter of this invention will now be discussed with more particularity with relation to the following drawings.

FIGURE 1 shows spray freeze apparatus according to one embodiment of this invention, and FIGURE 2 shows combination spray-immersion freeze apparatus according to a second embodiment of this invention.

The spray freeze apparatus 1 of FIGURE 1 is inclined at an angle from the horizontal, for example, but not limited to an angle of 10°, the infeed end 2 being inclined downwardly from the spray freeze area 30, to be described more particularly hereinafter.

The articles of food enter the spray freeze apparatus 1 at end 2 on a conveyor belt 3. The conveyor belt is preferably of a metal mesh material, for example, stainless steel. The articles progress on the conveyor belt 3 toward the higher discharge end 4. Prior to the discharge end 4 of the spray freeze apparatus 1 is a liquid spray header 5, in spray freeze area 30, for spraying cryogenic liquid, for example, liquid nitrogen, upon the articles of food contained on the conveyor belt 3. The liquid spray evolving from the spray header vaporizes upon contact with the relatively warm articles and conveyor belt 3. As the liquid spray vaporizes it withdraws heat from the articles of food, rapidly causing at least partial freezing of said articles. The extent to which the articles are frozen depends on the contact time of the liquid spray with the articles. Within a short time, less than a minute, many articles of food, such as tomatoes, will be partially frozen. (Partial freezing is all that is desirable with many articles of food.) If the time of contact is extended, the articles of food will freeze completely during contact with the liquid spray (such complete freezing being desirable with other articles of food). Said articles of food have been pre-cooled earlier on the conveyor belt 3 as the result of contact with the vapor evolving from the liquid spray, which vapor continuously flows toward the lower feed end of the machine, contacting the articles of food as it moves toward the lower feed end of the apparatus. The pre-cooling of the articles of food which takes place on the belt prior to direct contact of the articles of food with the liquid spray increases the economy of the utilization of the cryogenic media by utilizing the refrigeration capacity of the media while in the vapor form, which vapor form serves to cool the articles of food and also to firm the food articles so that the handling of said articles on the apparatus while being transported toward the spray is facilitated, without the cracking or distortion that often occurs during handling.

In the course of handling the articles of food, it is sometimes found necessary to divide the conveyor belt 3 into two sections, one section generally in the pre-cool area and one section utilized for carrying the articles of food immediately before and during spraying. Such breaking of the conveyor belt into two sections is usually accomplished by employing a single belt and a doubling drum. It is done to reduce the sticking problem that occurs with certain products when they contact a cold metal surface. The transporting of the product over a "dead plate" at a belt break or a doubling drum reduces sticking problems. When two belts or any combination of belts are used, the plate known as a "dead plate" is often utilized for transferring the food articles from one belt to the other or from one section of the same continuous belt to another. The firming of the articles of food previously described serves to allow transfer of the articles of food from one belt to another, across the "dead plate," if utilized, without encountering sticking problems to the belt of said articles.

It will be noted in FIGURE 1 that power structure for moving the spray conveyor is shown generally at 6 as a motor 7, pulley structure 8, and connecting belt 9.

The use of fans 10, 11, and 27 and baffle structure 12, 13, and 14 in combination with the utilization of the inclined surface increases the economy of utilization of the cryogenic media. This is because fan 10 elevates the vapor resulting from the contact of the liquid spray with the articles of food and conveyor belt 3, from which point the vapor moves downwardly toward the inlet end 2, passing through the mesh conveyor belt 3 and passing under baffle structure 12 in its travel toward the lower end of the machine, to be raised again by fan 27, thus repeating its movement with respect to baffle structure 13, fan 11, baffle structure 14, etc. This repeated elevating and settling of the vapor during its movement downward toward the ingress end of the apparatus results in the vapor passing over, around and through the belt to cool the counter-currently moving articles of food on the belt and in efficient use of the vapor evolving from the liquid spray.

The specific number and arrangement of fans and baffle structures shown are not intended to limit the combination of fans and baffle structure used in a particular apparatus designed according to this invention, but rather said particular number and arrangement is shown purely for illustrative purposes.

An exhaust blower 15, shown in FIGURE 1, may be employed to further induce the vapor from the liquid spray header to move toward the lower end of the machine.

FIGURE 1 is shown utilizing spray freeze header 5. For certain food articles such as fish, shell fish, mushrooms, and most breaded products of all forms, spray freezing is superior to immersion type freezing, since, for example, cracking during freezing is substantially avoided and the taste, appearance, and moisture level is superior. However, where immersion freezing is preferred over spray freezing, the apparatus described in FIGURE 1 may be utilized with the substitution for the liquid spray header shown of an immersion bath through which the articles of food are passed.

The spray freezing apparatus shown in FIGURE 1 is preferably contained within an insulated tunnel, shown in phantom outline.

A post-cooling area (not shown in FIGURE 1) advantageously may be added to the discharge end 4, for equilibration of the temperature of the articles of food after contact with the liquid cryogenic media within a controlled low temperature environment. Said post-cooling area preferably is inclined downward from the spray or immersion area so that a portion of the evolving vapor will come in contact with the article of food in said post-cool area. Fan and baffle structure arrangement may be used, in the manner previously described in combination with the downward incline to implement the movement of the vapor to the post-cool area.

The operation of the apparatus 1 of FIGURE 1 will now be described.

The articles of food are transported on conveyor 3 from the point of ingress at the lower end 2 through the pre-cool area to the spray freezing area 30. Pre-cooling is accomplished as the result of heat exchange between the evolved cool vapor from the cryogenic liquid and the articles of food product, which articles and vapor are moving generally in counter-current directions. The food product increasingly becomes cooler as it moves through the pre-cool area. In combination with the incline of the pre-cool area, the vapor is advantageously moved up, down and around the food product as the result of a fan and baffle arrangement. As stated previosuly, during said pre-cooling, the articles of food become firmer resulting in easy handling of said articles during transport through the apparatus, without damage to the articles. The firmed food articles are then conveyed to a second area, in which area they are brought into contact with a cryogenic liquid, for either partial or complete freezing of each article.

The incline of the spray freezing apparatus and the combination with said incline of vapor circulating fan and baffle arrangement result in efficient and economic use of the cryogenic media. In the spray freezing area 30, the cryogenic liquid absorbs heat from the food articles and evolves into a vapor, which vapor flows downwardly cooling the counter-currently moving articles of food as earlier described. Substantially the total latent heat of vaporization of the cryogenic liquid emerging from the spray header 5, for example, liquid nitrogen, is utilized in the course of transferal of the liquid nitrogen to gaseous nitrogen at −320° F. Furthermore, a substantial amount of the sensible heat of the cryogenic media is utilized since the gaseous nitrogen is raised in temperature from −320° F. at the point of vaporization to approximately 0° F. at the discharge end 4 of the conveyor. Of course, another exit temperature of the gaseous nitrogen at the discharge end may be provided for, if desired.

As previously described, a post-cooling area utilizing the cold vapor evolved from the cryogenic liquid may be added to the apparatus just described, said post-cooling area serving as an area for equilibration of the temperature of the food articles. In the case of articles only partially frozen as a result of heat exchange contact with the cryogenic media, the inclusion of such post-cooling area is preferable and highly advantageous since equilibration of the temperature of the food article can then occur in a controlled environment as to both atmospheric constituents and temperature.

The articles of food can be frozen solid or may be frozen only partially during the period of contact with the liquid spray, by varying a number of alternative variables in the apparatus of FIGURE 1, for example, by varying the quantity of flow of cryogenic liquid from the spray header, by varying the conveyor belt speed, or by varying the quantity of food article on the belt.

In an alternative embodiment, the articles of food may be first sprayed with a cryogenic liquid so as to partially freeze them, freezing the outward areas of the food article, and then immersed in a cryogenic liquid so as to continue to freeze the articles, and, if desired, completely freeze the articles of food. Such an alternative embodiment is shown in FIGURE 2. In FIGURE 2, like reference numerals as those used in FIGURE 1 indicate like parts.

An immersion bath area 16 has been added in FIGURE 2 to the spray freeze apparatus shown in FIGURE 1. The apparatus for effecting immersion in the liquid bath 19 may be of any type desired. A paddle wheel construction 17 for immersing food articles, shown diagrammatically at 18, in the bath of cryogenic liquid 19 is shown in FIGURE 2, but said paddle wheel construction 17 is merely illustrative of any immersion apparatus desired. The immersion liquid bath 19 may be collected, at least in part, as a result of draining the liquid from spray freeze header 5 not vaporized (which is minimal under normal conditions) so as to economically use whatever cryogenic liquid which does not vaporize upon contact with the food articles and conveyor belt 3 in the spray freeze area. Such collection may be effected by simple gravity feed or pump means (not shown) as desired.

In the embodiment illustrated in FIGURE 2, the food articles are transferred to the immersion freezing area 16 from the conveyor belt 3, after pre-cooling and spray freezing as described in relation to FIGURE 1, by use of a dead plate 20. Of course, other means of transferal may also be utilized. In like manner, dead plate 21 transfers the immersion frozen article from the immersion freezing area 16 or further processing, such as post-cooling in post-cooling area 22 shown in FIGURE 2. The post-cooling area 22 utilizes the vaporized cryogenic liquid from the immersion freezing area 16 in the same manner that the pre-cool area discussed in relationship to FIGURE 1 utilizes the vaporized cryogenic liquid from the spray freezing area. That is, the vaporized cryogenic liquid from immersion freezing area 16, being more dense and heavy, naturally settles in the post-cool area 22 which is lower than said immersion freeze area. The use of baffle structure, diagrammatically shown at 24 and 25, and fan structure (not shown) will produce the current of cold vapor described above in relation to FIGURE 1, for the post-cooling shown in FIGURE 2. Cold vapor evolving from the cryogenic liquid of immersion freezing area 16 will thus circulate about the articles of food on conveyor belt 26 in the post-cool area before exiting to the atmosphere, to a reliquefier, or for other use, for example, for transfer and used in the pre-cool area, through an outlet, for example, shown generally at 27. The equilibrated articles of food will exit from conveyor belt 26 off dead plate 28 in the embodiment shown.

Dead plate structure 41 may be used to transfer the articles of food onto the belt 3. The fan and baffle structure utilized in the pre-cool area, in combination with the incline, as discussed in relation to FIGURE 1, is shown generally at 44 and 45, respectively, in FIGURE 2.

As described in relation to FIGURE 1, the conveyor belt structure of FIGURE 2 may be empowered in any desired manner, such as by electrical power.

It can be appreciated that the apparatus of FIGURE 2 combines spray freezing and immersion freezing so that partial freezing of the exterior after pre-cooling may be had before either partial or complete immersion freezing, and then post-cooling, if desired. The availability of spray freezing before immersion in the liquid bath in the apparatus of FIGURE 2 insures that the articles of food will be partially frozen on immersion and thus can be transferred in a natural form, for example, flat as in a tomato slice, and will retain this flat or other desired form upon entering the immersion bath and will not crack or break upon the handling necessary for immersion. As described, the operation of the apparatus of FIGURE 2 allows for the economic use of the cryogenic liquid used for food freezing, as aided by the utilization of a design resulting in full employment of the evolved vapor.

The apparatus of FIGURE 2 will be employed in the following manner. The articles of food enter the apparatus onto conveyor belt 3 in a pre-cool area. In this section, the surface is hardened and a large percentage of the specific heat in the food article is removed as the temperature of the article approaches the freezing point under the influence of the descending vapor evolving from the spray header 5. Portions of the skin of the article may be frozen, depending on the speed of the conveyor 3 and the quantity of descending vapor. The evolved vapor in the pre-cool area also serves to keep the conveyor belt 3 cool, so as to maintain a relatively small temperature difference between the belt and the food articles. The fact that the articles of food and the belt 3 are of a substantially similar temperature aids in eliminating sticking of the articles to the belt. This positive effect of pre-cooling the belt 3 obviously is also present in the apparatus designed according to the plan of FIGURE 2.

In the spray freeze area, the food article on conveyor belt 3 is refrigerated by a cryogenic liquid spray emerging from spray header 5, which cryogenic liquid comes directly into contact with the food article. In this spray freeze area, the article is at least frozen in its areas at and near its surface. According to this method, for example, tomato slices would be frozen, on the belt 3 in the spray freeze area sufficiently so that they can be handled without further distortion to the slices during completion of the freezing operation in the immersion freezing and post-cooling areas, since the slices remain perfectly flat as the result of at least partial freezing.

The operation of the apparatus of FIGURE 2 continues with the food article moving across dead plate 20 dropping into the cryogenic liquid 19 in the immersion freezing area 16. The food articles are conveyed through this liquid by any mechanical method desired, such as the paddle wheel 17 shown, or by use of a forced current, a conveyor, or any other desired means. The articles are further frozen in the immersion freezing area, either completely frozen or only partially frozen if such partial freezing is desirable, as in the case of tomatoes.

The articles of food then move across the dead plate 21 onto the conveyor 26 for a tempering and post-cooling operation. In this area the product temperature equilibrates to the desired end temperature. If the articles were only partially frozen in the immersion freezing area, that is the center of each article remains unfrozen at the time of immersion, then the freezing of the articles will be completed at the time of post-cooling as a result of heat transfer from the warm inner part of each article to the frozen outer part. The refrigeration for the post-cooling is supplied from the evolved vapors descending from the immersion portion 16 of the apparatus, as aided by the baffle and fan arrangement described.

As emphasized earlier, the angle of inclination of the pre-cool and spray freeze areas of the machine and the relation of the post-cool area to the immersion freezing area allows for the economic use of the evolved gases of the cryogenic liquid, as does the use, in combination with the inclination, of the baffle and fan arrangement described.

The particular details of the apparatus described in relation to FIGURES 1 and 2 above are not meant to limit the scope of this invention. Rather, it is intended that the scope of this invention be limited only by the following claims.

We claim:
1. A method of freezing articles of food comprising the steps of directing cold vapor evolved from liquid nitrogen down an incline, conveying said articles upward along said incline in heat exchange relationship with said vapor so as to cool said articles, spraying liquid nitrogen upon said cooled articles in order to at least partially freeze said articles and vaporize the liquid nitrogen sprayed thereon, and utilizing vapor thus formed as the said cold vapor directed down said incline.

2. The method of freezing articles of food as claimed in claim 1, comprising the further step of circulating said downwardly directed vapor about said articles by the use of fan and baffle structure.

3. The method of freezing articles of food as set forth in claim 1, comprising the further step of immersing said articles in a bath of liquid nitrogen after spraying in order to further lower the temperature thereof.

4. The method of freezing articles of food as set forth in claim 1, comprising the step of exposing the articles after spraying to vapor evolved from said spray.

5. Apparatus for freezing articles of food comprising conveying means for moving said articles from one end of the apparatus through the apparatus, said conveying means being inclined at a constant slope upwardly from said one end of the apparatus, a first pre-cool area, said conveying means moving said articles through said first pre-cool area, said articles being cooled and firmed while on said conveying means in said first pre-cool area as a result of contact with vapor evolved from liquid nitrogen to a temperature near the freezing point of the articles, a second area in which said articles are at least partially frozen, said conveying means transporting said articles from said first pre-cool area through said second area, means for spraying liquid nitrogen directly upon said articles and said conveying means while said articles are transported through said second area, said first and said second areas also being inclined upwardly from said one end so that the vapor evolved from vaporization of the liquid nitrogen as a result of contact with the articles and conveying means in the second area descends in counter-current relation to the movement of the articles on said constantly sloping conveying means to form the vapor in the first area, and means consisting of fan and baffle structure arranged at least throughout the first pre-cool area for circulating the vapor in its movement down toward the infeed end about the articles transported on said conveying means.

6. An apparatus as claimed in claim 5, further comprising an immersion area including a bath of liquid nitrogen, means for immersing said articles in said bath for further lowering of the temperature thereof immediately after movement on said conveying means through said second area, and a post-cool area in which equilization of the temperature of the articles of food after immersion takes place, means for moving said articles from said immersion area through said post-cool area, means for filling said post-cool area with nitrogen vapor, said last-mentioned means including provision that the post-cool area be generally lower than said immersion area so that at least part of the vapor evolved by vaporization from said bath will descend through said post-cool area, and means consisting of fan and baffle structure arranged throughout the post-cool area for circulating the vapor about the articles.

7. An apparatus for freezing articles of food comprising an infeed end, a first area in which said articles are pre-cooled and firmed as a result of contact with a vapor of liquid nitrogen, conveying means moving from said infeed end through said first area for conveying said articles from the infeed end through the first area, a second area in which said articles are at least partially frozen as a result of direct contact with liquid nitrogen, said conveying means moving from said first pre-cool area through said second area for conveying said articles through said second area, means for spraying said articles and said conveying means with said liquid nitrogen while said articles move through said second area, corresponding sections of said conveying means, said first area and said second area being inclined on an upward slope to the horizontal from the infeed end so that at least part of the vapor evolved from the cryogenic liquid upon contact of said liquid with the articles and the conveying means descends the incline to form said pre-cooling vapor.

8. An apparatus for freezing articles of food as claimed in claim 7, further comprising means consisting of baffle structure mounted in the first area for circulating the vapor in its movement down the incline toward the infeed end about the articles transported on said conveying means.

9. An apparatus for freezing articles of food as claimed in claim 8, further comprising means consisting of fan structure mounted in the first area for aiding still further in circulating the vapor in its movement.

10. A method of freezing articles of food in an apparatus having an inlet end comprising the steps of directing a vapor evolved from liquid nitrogen toward the inlet end down an incline, conveying said articles from said inlet end with conveying means upward along said incline countercurrently to said vapor in heat exchange relationship with said vapor so as to cool and firm said articles, circulating said vapor about said articles with baffle means, after conveying said articles upward along said incline in heat exchange relationship with said vapor spraying liquid nitrogen upon said articles and conveying means in order to at least partially freeze said articles, and deriving said vapor evolved from liquid nitrogen from the vapor evolved as a result of heat exchange contact of the sprayed liquid nitrogen with the articles and conveying means.

References Cited by the Examiner
UNITED STATES PATENTS

| | | | |
|---|---|---|---|
| 1,930,414 | 10/1933 | Buhr | 62—380 |
| 1,933,257 | 10/1933 | Goosmann | 62—63 X |
| 2,059,970 | 11/1936 | Robillard | 62—63 |
| 2,237,257 | 4/1941 | Finnegan | 62—63 |
| 2,447,249 | 8/1948 | Hill | 62—63 |
| 2,784,567 | 3/1957 | Reynolds | 62—64 X |
| 2,951,353 | 9/1960 | Morrison | 62—375 |
| 3,022,636 | 2/1962 | Morrison | 62—64 |
| 3,039,276 | 6/1962 | Morrison | 62—64 |
| 3,048,989 | 8/1962 | Morrison | 62—375 |
| 3,114,248 | 12/1963 | Morrison | 62—64 |
| 3,166,425 | 1/1965 | Morrison | 62—64 X |

EDWARD J. MICHAEL, *Primary Examiner.*

UNITED STATES PATENT OFFICE

CERTIFICATE OF CORRECTION

Patent No. 3,298,188  January 17, 1967

Robert C. Webster et al.

It is hereby certified that error appears in the above numbered patent requiring correction and that the said Letters Patent should read as corrected below.

Column 8, line 20, after "comprising the" insert -- further --.

Signed and sealed this 5th day of November 1968.

(SEAL)
Attest:

Edward M. Fletcher, Jr.

Attesting Officer

EDWARD J. BRENNER

Commissioner of Patents